United States Patent
Nitta et al.

(10) Patent No.: US 7,987,900 B2
(45) Date of Patent: Aug. 2, 2011

(54) HEAT EXCHANGER WITH HEAT EXCHANGE CHAMBERS UTILIZING RESPECTIVE MEDIUM DIRECTING MEMBERS

(75) Inventors: Minoru Nitta, Upland, CA (US); Takeyoshi Nitta, Upland, CA (US)

(73) Assignee: Mikutay Corporation, Upland, CA (US)

( * ) Notice: Subject to any disclaimer, the term of this patent is extended or adjusted under 35 U.S.C. 154(b) by 533 days.

(21) Appl. No.: 12/148,655

(22) Filed: Apr. 21, 2008

(65) Prior Publication Data
US 2009/0260788 A1   Oct. 22, 2009

(51) Int. Cl.
*F28F 13/12*   (2006.01)
*F28F 9/22*   (2006.01)
*F28F 1/40*   (2006.01)

(52) U.S. Cl. .............. 165/109.1; 165/174; 165/177; 138/38

(58) Field of Classification Search ............. 165/109.1, 165/174, 177; 138/38
See application file for complete search history.

(56) References Cited

U.S. PATENT DOCUMENTS

| | | | | |
|---|---|---|---|---|
| 141,133 | A * | 7/1873 | Gee ............................ | 165/144 |
| 265,279 | A * | 10/1882 | Pierce et al. .................. | 165/144 |
| 709,006 | A * | 9/1902 | Geurink ........................ | 122/216 |
| 1,327,165 | A * | 1/1920 | Merritt ......................... | 165/148 |
| 1,656,790 | A * | 1/1928 | Heijkenskjold ............... | 165/90 |
| 1,666,660 | A * | 4/1928 | Makin .......................... | 165/142 |
| 1,844,308 | A | 2/1932 | Armacost | |
| 1,946,234 | A | 2/1934 | Price | |
| 2,030,734 | A * | 2/1936 | Baird .......................... | 165/109.1 |
| 2,274,965 | A * | 3/1942 | Kiito ............................ | 165/177 |
| 2,752,127 | A * | 6/1956 | Campe et al. ................. | 165/145 |
| 3,099,315 | A * | 7/1963 | Loehr ........................... | 165/109.1 |
| 4,981,170 | A * | 1/1991 | Dierbeck ...................... | 165/109.1 |
| 5,505,252 | A * | 4/1996 | Mano ........................... | 165/109.1 |
| 2007/0215330 | A1 | 9/2007 | Umetsu et al. | |

FOREIGN PATENT DOCUMENTS

| | | |
|---|---|---|
| DE | 2249117 A1 | 4/1974 |
| DE | 3300929 A1 | 7/1984 |
| FR | 2898405 A1 | 9/2007 |
| JP | 56154275 | 11/1981 |
| JP | 11287571 | 10/1999 |
| WO | WO 2008/139651 A1 | 11/2008 |

OTHER PUBLICATIONS

PCT Notification of Transmittal of the International Search Report and the Written Opinion of the International Searching Authority, or the Declaration (dated Jul. 30, 2009; 3 pgs.).
PCT: International Search Report (dated Jul. 30, 2009; 4 pgs.).
PCT: Written Opinion of the International Searching Authority (dated Jul. 30, 2009; 6 pgs.).

* cited by examiner

*Primary Examiner* — Leonard R Leo
(74) *Attorney, Agent, or Firm* — Pillsbury Winthrop Shaw Pittman LLP

(57) ABSTRACT

A heat exchange chamber includes an inlet, an outlet and a plurality of walls defining a chamber interior. The inlet receives a heat exchange medium flowing in a first flow direction in an initial line of flow. Disposed within the chamber interior is a medium directing member, having an inclined surface, which diverts the medium from the initial flow direction so that it disperses within the chamber interior. The medium exits the chamber, via the outlet, in the initial line of flow. The chambers are interconnected by tubes to form assemblies. Plural sets of chamber and tube assemblies are arranged between manifolds to provide a heat exchanger.

55 Claims, 12 Drawing Sheets

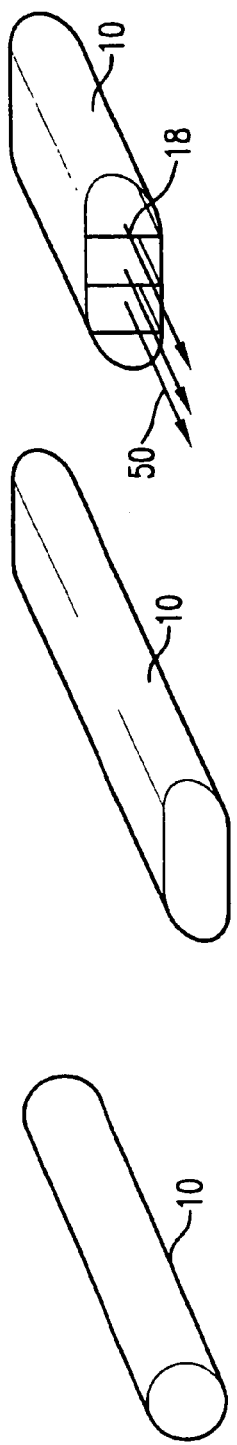
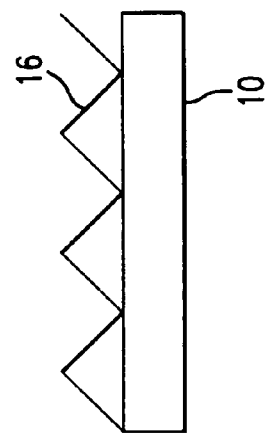
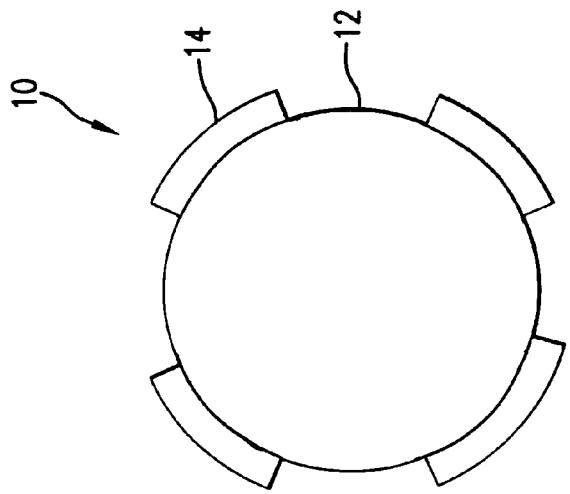
FIG. 4A
FIG. 4B
FIG. 4C
FIG. 4D
FIG. 4E

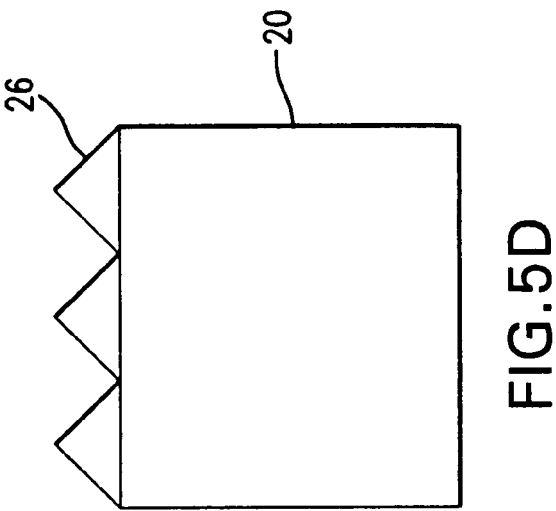
FIG.5D
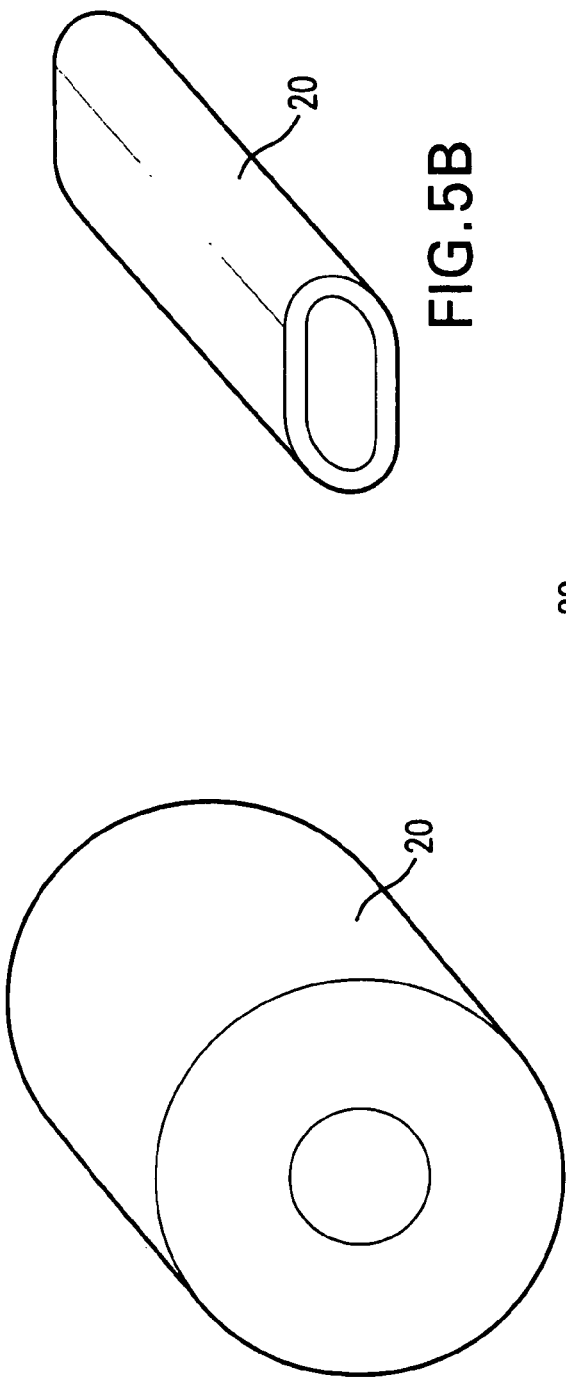
FIG.5B
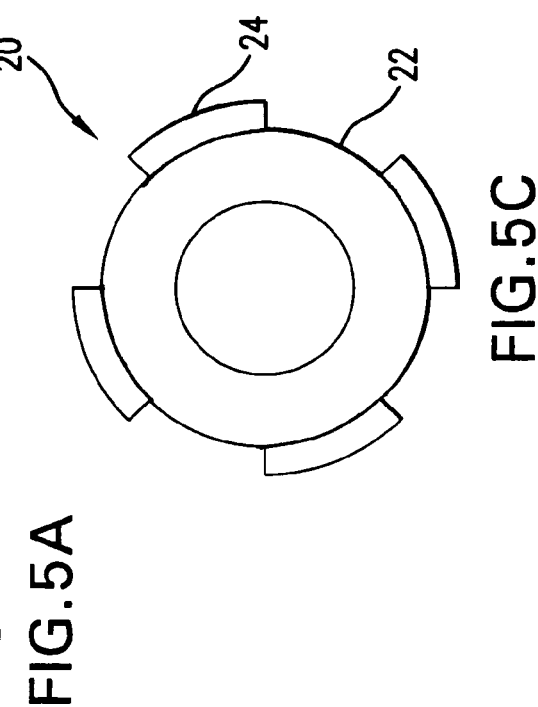
FIG.5C
FIG.5A

HEAT EXCHANGER WITH HEAT EXCHANGE CHAMBERS UTILIZING RESPECTIVE MEDIUM DIRECTING MEMBERS

BACKGROUND OF THE INVENTION

1. Field of the Invention

The present invention relates generally to heat exchangers and, more specifically, to a tube and chamber apparatus for transporting heat exchange media.

2. Discussion of the Related Art

Heat exchangers are commonly utilized in systems where it is desired for heat to be removed. Typical basic heat exchangers are made of pipes, which channel heat exchanging media. Headers or manifolds are attached to each end of the pipes. These headers and manifolds act as receptacles for the heat exchanging media. The efficiency of the pipe heat exchangers is limited by the amount of surface area available for the transfer of heat.

To add more surface area, some heat exchangers, such as condensers, incorporate a "tube-and-fin" design. This type of heat exchanger typically includes flattened tubes having a fluid passing therethrough and a plurality of fins extending between the tubes. The fins are attached to the tubes to effectively increase the surface area of the tubes, thereby enhancing heat transfer capability of the tubes. A number of tubes and fins may be stacked on top of each other, which leaves a small opening to allow passage of air in between them. In another tube-and-fin design, the tube can be of a serpentine design, therefore eliminating the need for headers or manifolds, as the tube is bent back and forth in an "S" shape to create a similar effect. Typical applications of this type of heat exchanger, besides condensers, are evaporators, oil coolers, and heater cores. This tube-and-fin design is also utilized in radiators for automobiles. Outside of the automotive field, the tube and fin design is implemented by industrial oil coolers, compressor oil coolers, and in other similar applications requiring a higher efficiency heat exchanger.

In another effort to create a greater exchange of heat by increasing surface area, very thin flat tubes with intricate inner rib structures are utilized. This type of heat exchanger is similar to the tube-and-fin design, in that fins are combined with the flat tubes, but in this particular type of heat exchanger, the flat tubes contain intricate internal chambers formed by the inner rib structures. These inner rib structures help to increase the heat exchanging performance of the heat exchanger. To further improve heat transfer efficiency, the tube thickness is made thinner. As a result, the parts are lighter in weight, which in turn makes the overall heat exchanger lighter in weight. However, the pressure resistance is reduced, and the thinner tubes are more prone to damage. Also, the assembly process is complicated because of the fragile nature of the parts. In addition, the internal chambers are prone to plugging during the manufacturing process, particularly if a brazing process is utilized. The complexity of the extruding process potentially results in higher costs and higher defect rates. Also, by utilizing internal chambers within the flat tubes to help disperse heat, the overall cost for the heat exchanging system will be higher because a higher powered compressor may be necessary to move the heat exchanging medium through the smaller openings of the tubes. Conversely, if a higher powered compressor is not utilized, then additional tubes will be necessary to obtain the desired heat exchanging performance because the smaller tubes reduce the flow of the heat exchange media significantly. The additional tubes will increase the overall cost for the heat exchanging system.

Currently, this type of heat exchanger is used in applications requiring high heat exchanging capabilities, such as automotive air conditioner condensers.

A variation on the tube-based heat exchanger involves stacking flat ribbed plates. When stacked upon each other, these ribbed plates create chambers for transferring heat exchanging media. In essence, this type of heat exchanger performs substantially the same function as tube-and-fin type heat exchangers, but is fabricated differently. This type of heat exchanger is commonly implemented by contemporary evaporators.

SUMMARY OF THE INVENTION

The present invention is an enhanced tube for heat exchanging applications including a flow tube and a chamber. The flow tube connects to the chamber. One end of the flow tube may connect to a header or a manifold. Heat exchange media flows from the header or the manifold into the flow tube. The heat exchange media then flows into the chamber. The heat exchange media then flows from the chamber into another flow tube, which is connected to another header or manifold.

In an embodiment of the present invention, the flow tube and the chamber for a heat exchanger are provided, for example, for a condenser, evaporator, radiator, etc. The heat exchanger may also be a heater core, intercooler, or an oil cooler for an automotive application (i.e., steering, transmission, engine, etc.) as well as for non-automotive applications. An advantage of the present invention is that the heat exchange media contact surface area for radiating heat is greater over a shorter distance than that of a conventional heat exchanger. Therefore, the efficiency of the heat exchanger is increased. Another advantage of the present invention is that the overall length and weight of the enhanced tube for heat exchanging applications may be less compared to a conventional heat exchanger, which in turn provides for a lower overall cost as less raw material and less packaging is necessary. Furthermore, the smaller footprint of the present invention lends itself to be used in applications where space is limited. Yet another advantage of the present invention over a conventional heat exchanger is that the manufacturing process may be simpler because the present invention requires less fragile components and less manufacturing steps. The entire unit may be brazed together, or any portion of the unit can be brazed first, and then additional components may be brazed or soldered together.

In another embodiment of the present invention, more than one chamber may be used, which will further increase the surface area of the enhanced tube for the heat exchanger. Also, a first chamber may be connected directly to another chamber.

In yet another embodiment of the present invention, the tube size may vary between the chambers, and if more than one chamber is used, the chamber size may vary from one chamber to the next.

In a further embodiment of the present invention, each chamber may disperse heat exchanging media throughout the chamber, which further enhances the heat exchanging capabilities of the present invention. Also, each chamber may also mix heat exchanging media.

In yet a further embodiment of the present invention, each chamber may include a medium directing member and medium redirection members that direct and redirect heat exchanging media in particular directions through the chamber.

In another embodiment of the present invention, the inner surface of the tube may feature indentations to increase the surface area. Also, in yet another embodiment of the present invention, the inner surface of the chamber may also feature indentations to increase the surface area. In a further embodiment of the present invention, the redirection member may also feature indentations.

In other embodiments of the present invention, the tube and chamber combination may be repeated, and based on a particular application, there may be multiple tube and chamber assembly rows. Several of the tube and chamber units may be attached to a header or a manifold. There may be a plurality of tube and chamber units arranged in a row that are attached to a header or a manifold to enhance the overall performance of the heat exchanger.

In some embodiments, the chamber is of a greater diameter than the inlet and the outlet of the chamber. In other embodiments, the chamber is of a greater diameter than the inlet of the chamber, but may be the same diameter as the outlet. Alternatively, in yet other embodiments, the chamber may be of a greater diameter than the outlet of the chamber, but may be the same diameter as the inlet.

In yet some other embodiments, the chamber has at least one greater dimension than the tube. For instance, the chamber may have a greater fluid capacity, circumference, or surface area. The ratio of a particular dimension between the tube and the chamber may be 1:1.1; 1:1.5; or any other suitable ratio.

The tube and the chamber may be made of aluminum, either with cladding or without cladding. The tube and chamber may also be made of stainless steel, copper or other ferrous or non-ferrous materials. The tube and chamber may also be a plastic material or other composite materials.

The tube and chamber may be manufactured by stamping, cold forging, or machining. The tube and chamber may be manufactured as one piece or may be manufactured as two separate pieces.

Other features and advantages of the present invention will be readily appreciated, as the same becomes better understood after reading the subsequent description taken in conjunction with the accompanying drawings.

BRIEF DESCRIPTION OF THE DRAWINGS

FIGS. 4A through 4E illustrate various embodiments of the tube;

FIGS. 5A through 5D illustrate various embodiments of the redirect chamber;

DETAILED DESCRIPTION

Figure 1:
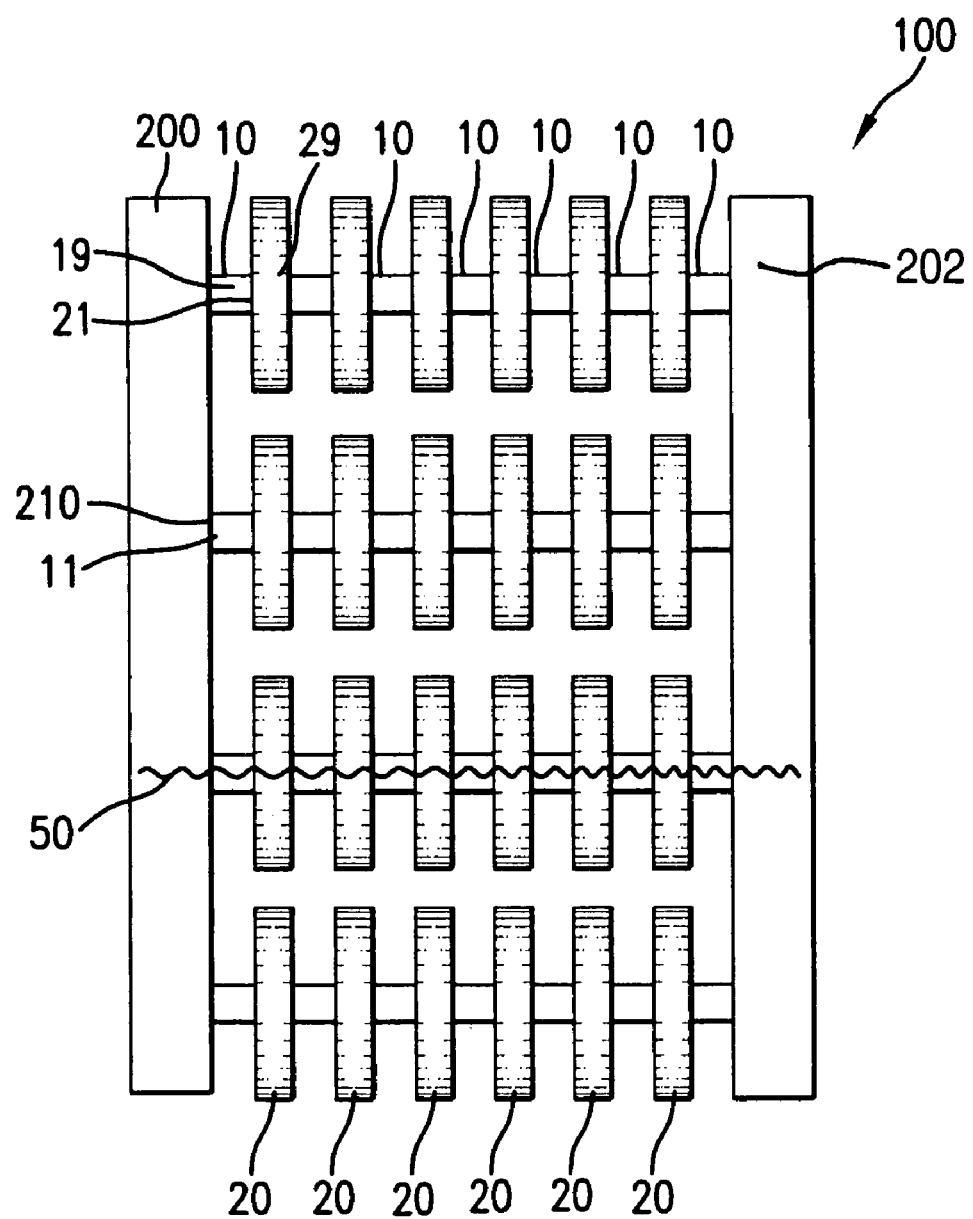
FIG. 1 is a perspective view of a tube and a chamber illustrated in operational relationship with manifolds to provide a heat exchanger according to embodiments of the present invention.

Referring to the drawings and in particular FIG. 1, an embodiment of a heat exchanger 100 is shown. The heat exchanger 100 includes a manifold 200 matingly engaged to free ends of tubes 10 that are brazed to redirect chambers 20. As shown in FIG. 1, the redirect chambers 20 have a greater fluid capacity than the tubes 10. Heat exchange media 50 flows from the outlet 210 of the manifold 200 into the inlet 11 of the tube 10. The heat exchange medium 50 passes through the outlet 19 of the tube 10 into the inlet 21 of the redirect chamber 20. The heat exchange media 50 then flows out an outlet 29 of the redirect chamber 20. The process of going from a tube 10 to a redirect chamber 20 may repeat several times until the heat exchange media 50 is received by another manifold 202. There may also be several rows of the tube 10 and redirect chamber 20 combinations. Also, one embodiment may allow for just one tube 10 and one redirect chamber 20. Throughout the transport of the heat exchange media 50 through the heat exchanger 100, the heat from the heat exchange media 50 is transferred to the environment outside of the heat exchanger 100. Although not meant to be limiting, common heat exchange media known in the art includes various refrigerants (i.e., R-134A), carbon dioxide, butane, oils, gases (e.g., air), water, and mixtures of water and other coolants.

In another embodiment of the heat exchanger 100, the heat exchanger 100 may be used in a reversed method. Instead of the heat exchanger 100 being used in an environment where heat is transferred from the heat exchange media 50 to the surrounding environment of the heat exchanger 100, the heat exchanger 100 may be used to increase the temperature of the heat exchange media 50 flowing inside the present invention. For example, water of an ambient temperature may flow through the tube 10 and the chamber 20 of the heat exchanger 100, where the environment surrounding the heat exchanger 100 is of a higher temperature than that of the water. Continuing with this example, the heat from the environment surrounding the heat exchanger 100 is transferred to the water, thereby increasing the temperature of the water. An example of this embodiment, which is not intended to be limiting, would be a water heater.

Figure 2A:
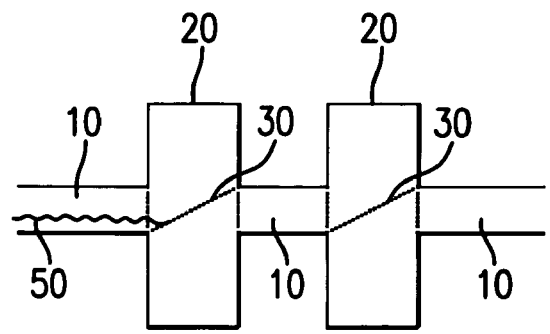
FIGS. 2A through 2B illustrate two embodiments of the present invention.

Referring to FIG. 2A, the inside of tube 10 is hollow, which allows for the flowing of the heat exchange medium 50. The tube 10 is mated to the redirect chamber 20. The redirect chamber 20 houses a medium-directing insert 30. The medium-directing insert 30 is positioned within the intersecting space between the tube 10 and the redirect chamber 20. The heat exchanging medium 50 flows through the tube 10 until the heat exchanging medium 50 flows into contact with the medium-directing insert 30. The medium-directing insert 30 directs the heat exchanging medium 50 into the inside of the redirect chamber 20. According to the present embodiment, the heat exchange medium 50 disperses throughout the redirect chamber 20 and heat is transferred from the heat exchange medium 50 to the redirect chamber 20.

Figure 3:
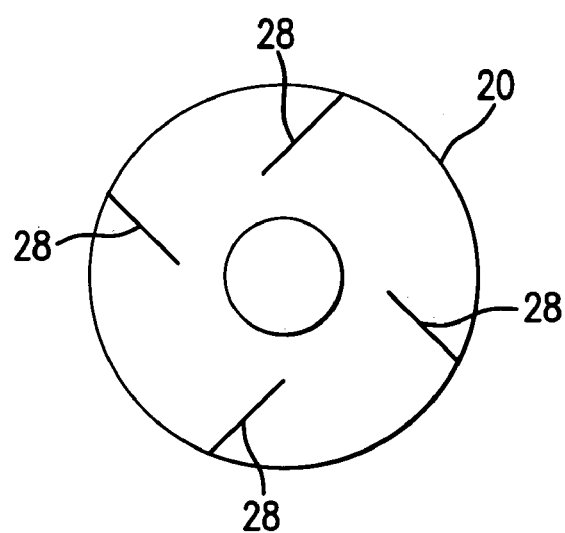
FIG. 3 is a view of a redirect chamber with redirection members.

Referring to FIG. 3, an embodiment of the redirect chamber 20 is shown. Redirection members 28 are attached to the redirect chamber 20. In this embodiment, the redirection members 28 are attached to the inner wall of the redirect chamber 20. Although not meant to be limiting, in FIG. 3, the redirection members 28 are secured at an angle. In addition, other embodiments may secure the redirection members 28 perpendicularly to the inside of the redirect chamber 20, that is, the redirection members 28 are at 90 degree angles.

Figure 2B:
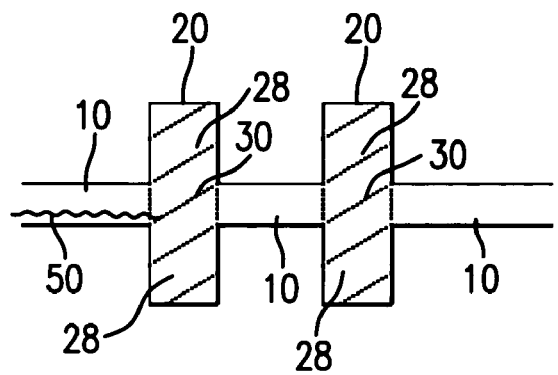

Referring to FIG. 2B, the inside of tube 10 is hollow, which allows for the flowing of a heat exchange medium 50. The tube 10 is mated to the redirect chamber 20. The redirect chamber 20 houses a medium-directing insert 30. The medium-directing insert 30 is fixed within the intersecting space between the tube 10 and the redirect chamber 20. The heat exchanging medium 50 flows through the tube 10 until the heat exchanging medium 50 flows into contact with the medium-directing insert 30. The medium-directing insert 30 directs the heat exchanging medium 50 into the inside of the redirect chamber 20. According to the embodiment in FIG. 2B, redirection members 28 direct the heat exchange medium 50 in a particular direction within the redirect chamber 20 and heat is transferred from the heat exchange medium 50 to the redirect chamber 20.

Figure 2C:
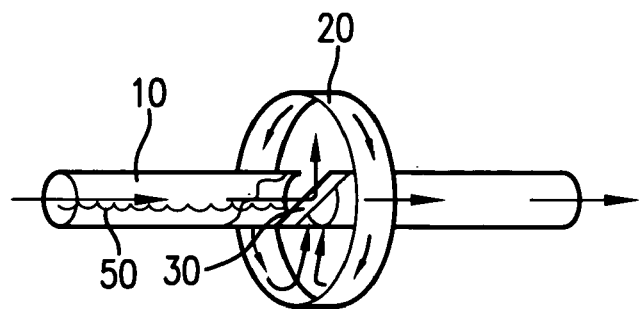
FIG. 2C is a perspective view of a tube and chamber with a medium-directing insert.

Referring to FIG. 2C, a perspective view of tube 10 and chamber 20 is shown. The inside of tube 10 is hollow, which allows for the flowing of the heat exchange medium 50, the flow direction is illustrated by the arrows. The tube 10 is mated to the redirect chamber 20. The redirect chamber 20 houses a medium-directing insert 30. The medium-directing insert 30 is fixed within the intersecting space between the tube 10 and the redirect chamber 20. The heat exchanging medium 50 flows through the tube 10 until the heat exchanging medium 50 flows into contact with the medium-directing insert 30. The medium-directing insert 30 directs the heat exchanging medium 50 into the inside of the redirect chamber 20. According to the present embodiment, the heat exchange medium 50 disperses throughout the redirect chamber 20 and heat is transferred from the heat exchange medium 50 to the redirect chamber 20.

Referring to FIG. 4A, the tube 10, in the illustrated embodiment, is hollow and circular. In another embodiment, as shown in FIG. 4B, the tube 10 is hollow and a non-circle shape. In yet another embodiment, as shown in FIG. 4C, ribs 18, which divide the area inside the tube 10 into smaller compartments for transferring the heat exchange media 50, are placed inside the tube 10 to increase heat exchange performance. FIG. 4D illustrates an embodiment of the tube 10 in which the tube wall 12 includes extensions 14. FIG. 4E illustrates a further embodiment of the tube 10 with tube fins 16 shrouding the outer surface of the tube 10.

Referring to FIG. 5A, redirect chamber 20, in the illustrated embodiment, is hollow and circular. In another embodiment, as shown in FIG. 5B, the redirect chamber 20 is hollow and a non-circular shape. FIG. 5C illustrates an embodiment of the redirect chamber 20 in which a chamber wall 22 includes extensions 24. FIG. 5D illustrates a further embodiment of the redirect chamber 20 with chamber fins 26 shrouding the outer surface of the redirect chamber 20. Although not meant to be limiting, the diameter of the inlet 21 of the redirect chamber 20 will be smaller than the overall diameter of the redirect chamber 20. Also, the diameter of the outlet 29 of the redirect chamber 20 will be smaller than the overall diameter of the redirect chamber 20.

The tube 10 embodiments shown in FIGS. 4A-4E may be mated in various combinations with the redirect chamber 20 embodiments shown in FIGS. 5A-5D. Additional tube fins 16 and chamber fins 26 or other materials can be attached to the outside surface of the tube 10 or the redirect chamber 20, and the additional material does not have to be attached for the full length of the tube 10. Tubes 10 and redirect chambers 20 near the inlet side of the invention may feature additional material. Other embodiments of the tubes and chambers not pictured may also be combined, and the invention is not limited to the embodiments described.

Figure 6A:
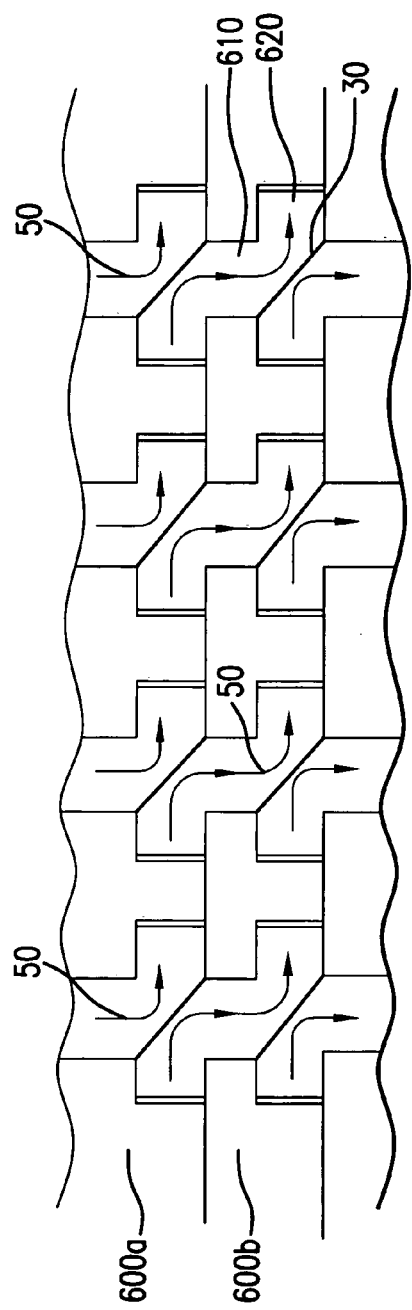
FIGS. 6A and 6B are different views of the invention heat exchanger formed by stacked plates.
Figure 6B:
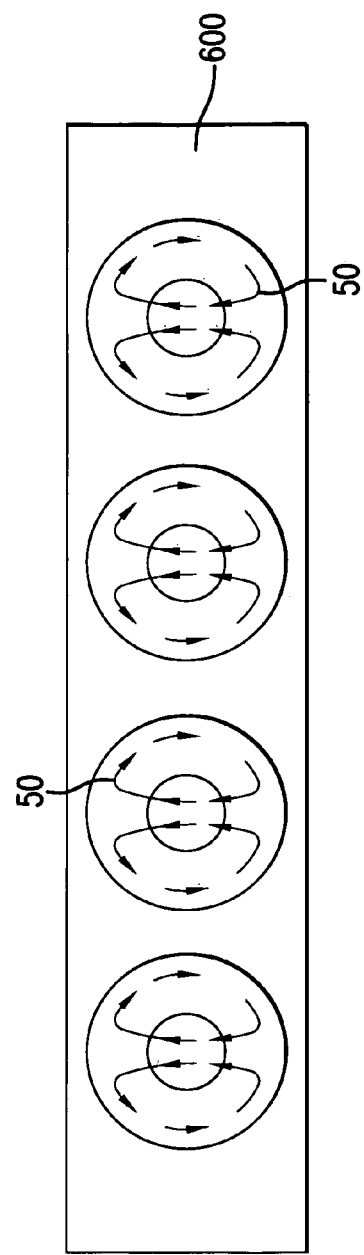

Referring to FIGS. 6A and 6B, another embodiment of a heat exchanger is shown. A plate 600 contains at least one hole 610 that goes through the thickness of the plate 600. On one side of the plate 600, and centered on the hole 610, a cavity 620, which is of a larger diameter than the diameter of the hole 610, is created in the plate 600 without going completely through the plate 600. One end of a medium-directing insert 30 is connected to an outer edge of the cavity 620, and the opposite end of the medium-directing insert 30 is connected to the inner edge of the cavity 620. When a plate 600a is stacked onto another plate 600b, and the respective holes 610 are aligned, the holes 610 create a tube-like segment and the cavities 620 create a chamber. Heat exchange media 50 may flow through the hole 610 into the cavity 620 where the heat exchange media 50 encounters the medium-directing insert 30 that redirects the heat exchange media 50 into the cavity 620, the flow direction is illustrated by the arrows.

Figure 7:
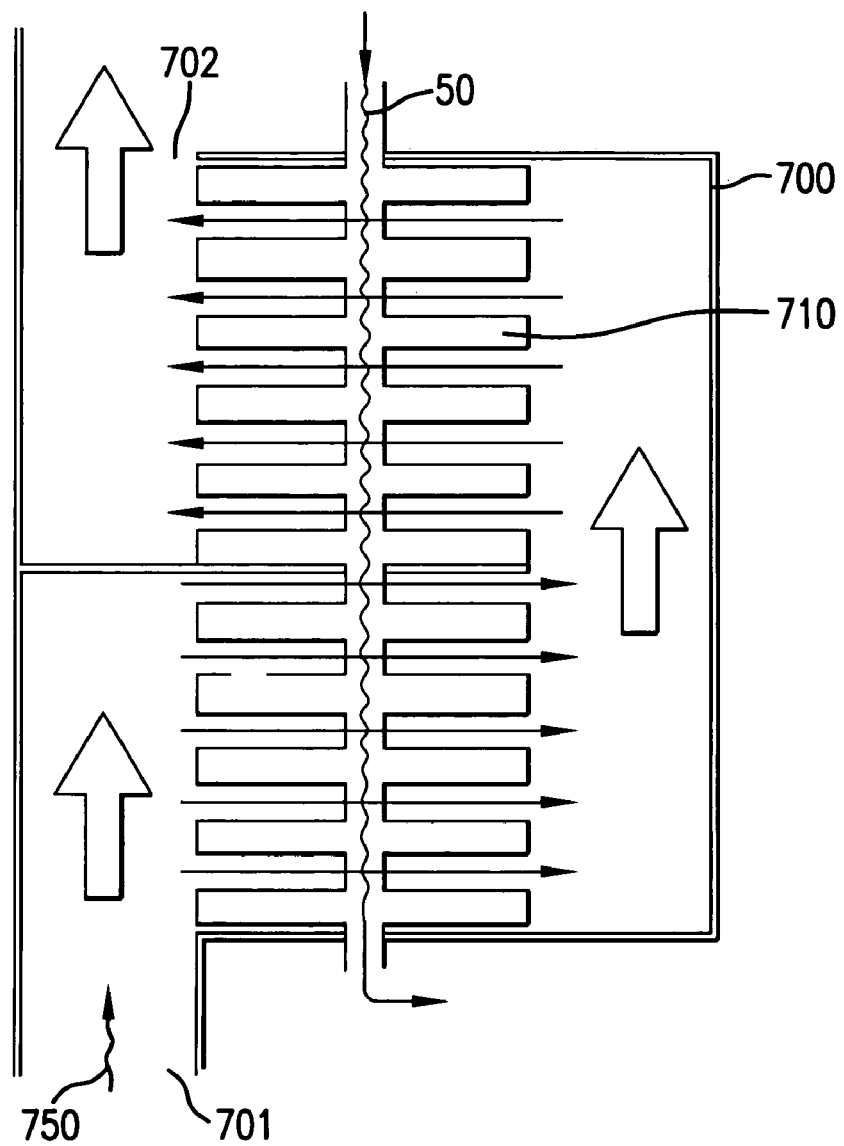
FIG. 7 is a cross-section of an embodiment of the invention surrounded by a compartment.

Referring to FIG. 7, another embodiment of a heat exchanger is shown. A compartment 700 surrounds a tube and chamber combination 710. The compartment 700 has an inlet 701 and an outlet 702. The compartment 700 directs an air flow 750 around a tube and chamber combination 710 while a heat exchange medium 50 flows through the tube and chamber combination 710. According to this embodiment, the transfer of heat is further facilitated by the movement of the air flow 750 across the tube and chamber combination 710.

Figure 8B:
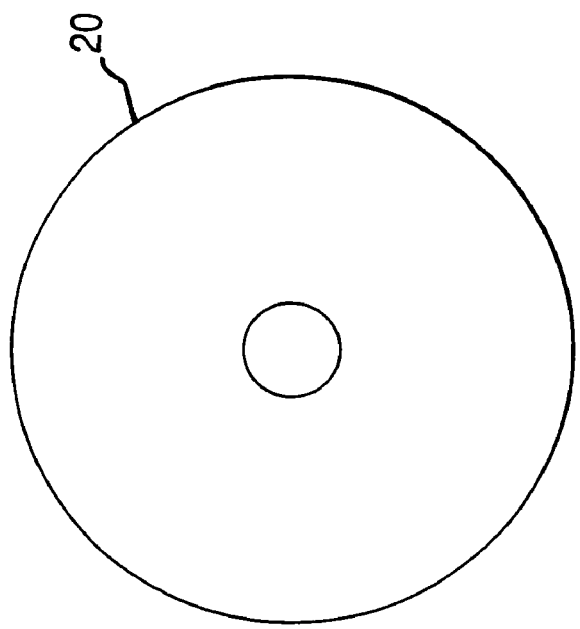
FIGS. 8A and 8B illustrate an embodiment of the invention illustrating a type of medium directing member.
Figure 8A:
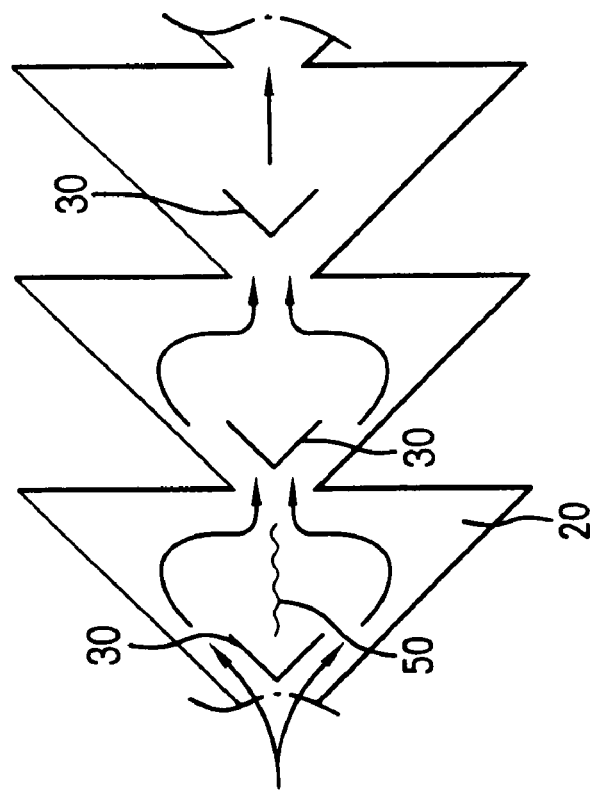

Referring to FIGS. 8A and 8B, one embodiment of the invention is shown. A chamber 20 is directly connected to another chamber 20, each of which house a medium directing member 30. In each chamber 20, the medium directing member 30 redirects heat exchange media 50 throughout the chamber 20. The arrows illustrate how the heat exchange media 50 may be redirected according to the embodiment as shown.

Figure 9B:
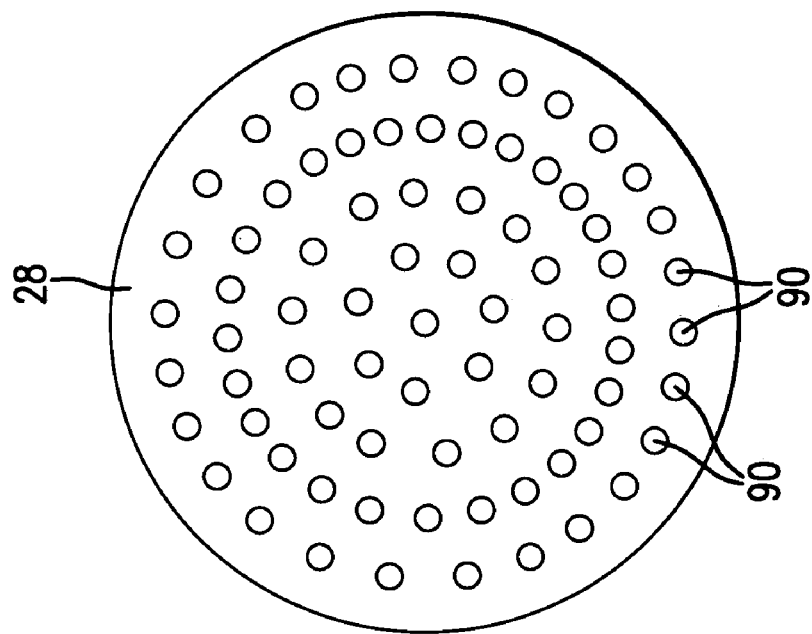
FIGS. 9A and 9B illustrate another embodiment of the present invention.
Figure 9A:
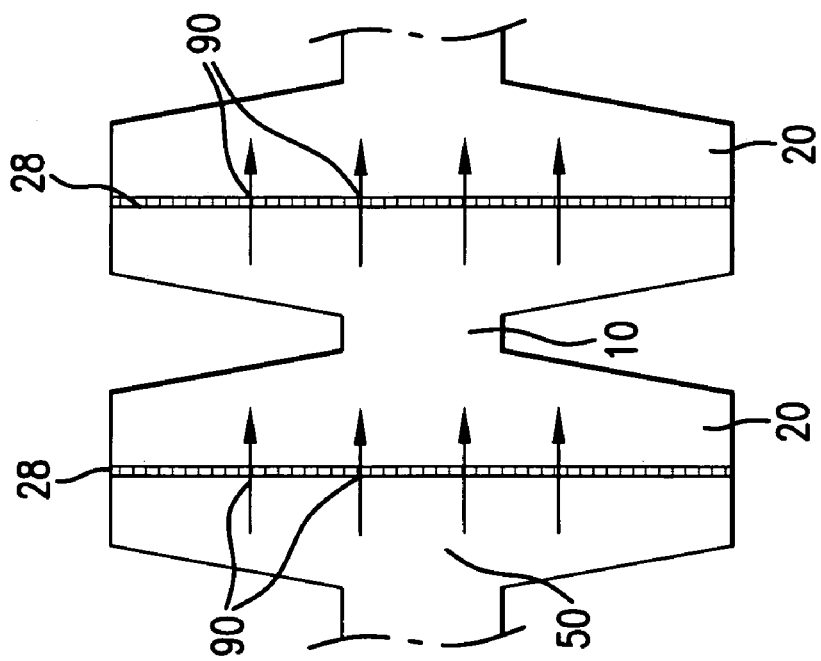

Referring to FIG. 9A, a cross-section of another embodiment of the invention is shown. A chamber 20 is connected to a tube 10 that is connected to another chamber 20. Each chamber 20 in the present embodiment houses a redirection member 28, which in this embodiment attaches to the inner surface of the chamber 20. The redirection member 28 allows passage of the heat exchange media through multiple holes 90 in the redirection member 28. The arrows illustrate how the heat exchange media 50 may be redirected according to the embodiment as shown. Referring to FIG. 9B, an embodiment of a redirection member 28 is shown. The redirection member 28 contains openings 90 that allow for the passage of heat exchange media 50.

Figure 10B:
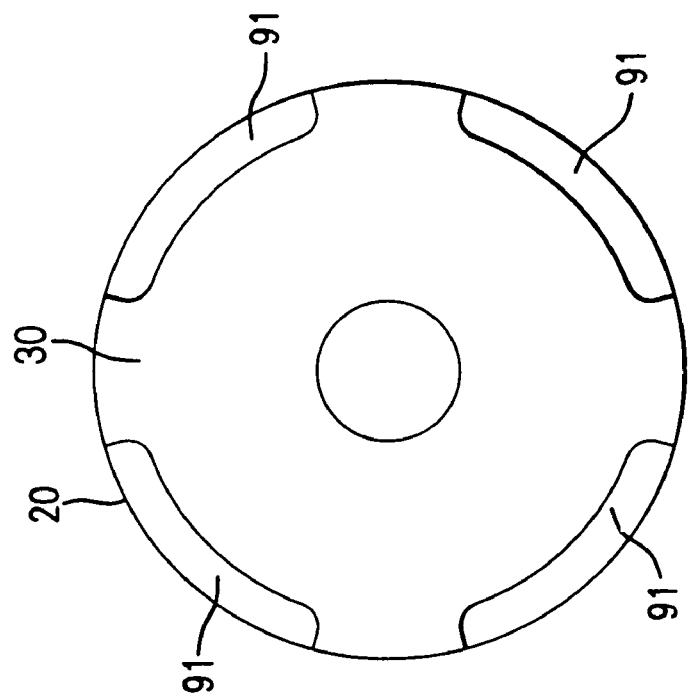
FIGS. 10A and 10B illustrate yet another embodiment of the present invention.
Figure 10A:
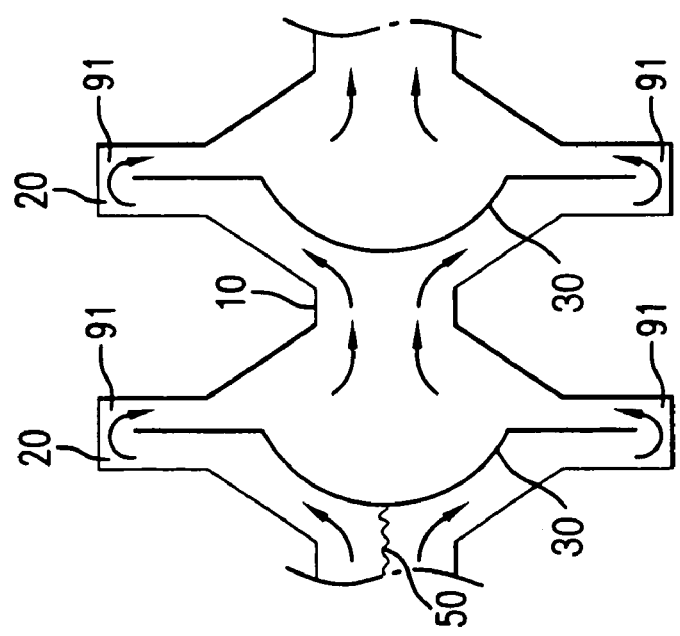

Referring to FIG. 10A, a cross-section of yet another embodiment of the invention is shown. A chamber 20 is connected to a tube 10 that is connected to another chamber 20. Each chamber 20 in the present embodiment may house a medium directing member 30, which in this embodiment attaches at certain points to the inner surface of the chamber 20, which leaves openings 91 along the inner surface of the chamber 20. The medium directing member 30 allows passage of the heat exchange media 50 through these openings 91. The arrows illustrate how the heat exchange media 50 may be redirected according to the embodiment as shown. Referring to FIG. 10B, an embodiment of a medium directing member 30 is shown. The openings 91 allow for the passage of heat exchange media 50.

Figure 11B:
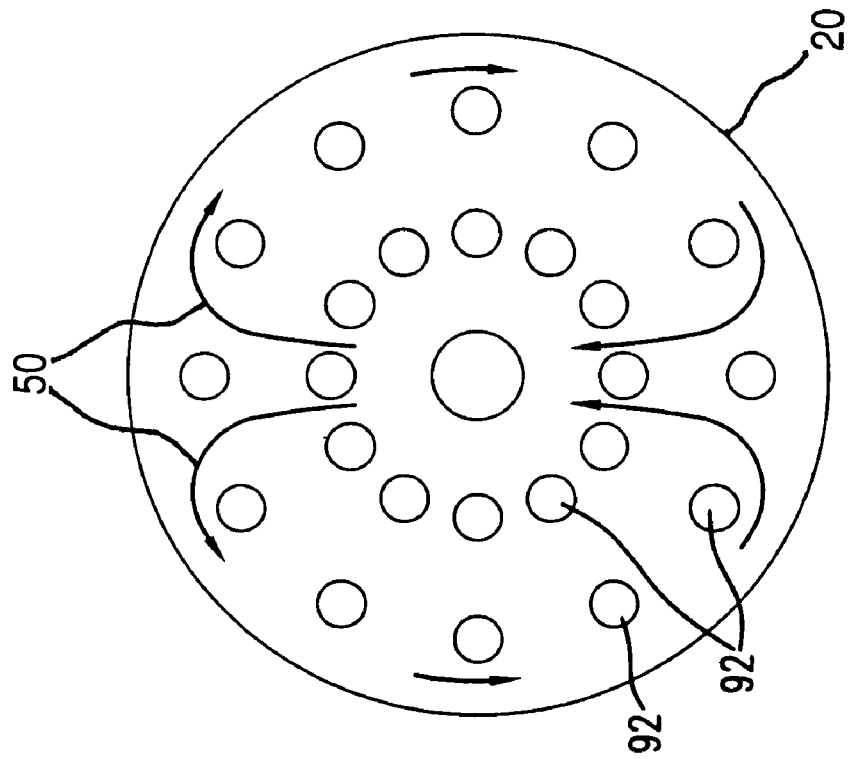
FIGS. 11A and 11B illustrate a further embodiment of the present invention.
Figure 11A:
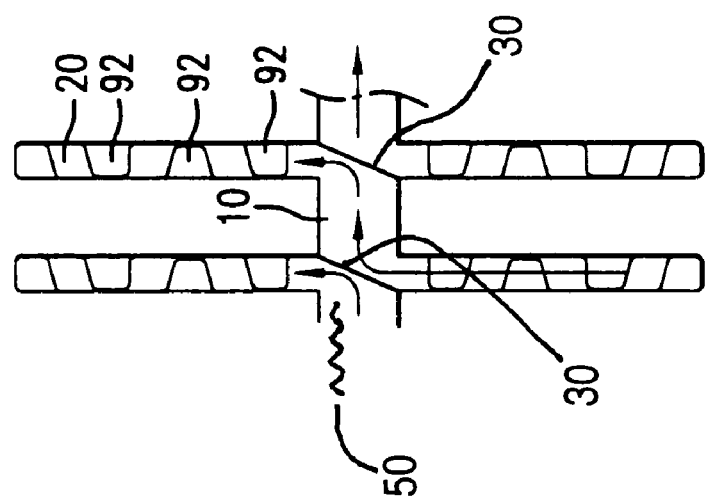

Referring to FIG. 11A, a cross-section of yet another embodiment of the invention is shown. The tube 10 is mated to the redirect chamber 20. The redirect chamber 20 houses a medium-directing insert 30. The medium-directing insert 30 is fixed within the intersecting space between the tube 10 and the redirect chamber 20. A chamber 20 is connected to a tube 10 that is connected to another chamber 20. Each chamber 20 in the present embodiment have indentations 92 in the chamber walls. The arrows illustrate how the heat exchange media 50 may be directed according to the embodiment as shown. Referring to FIG. 11B, an embodiment of a wall of a chamber 20 is shown. The wall of the chamber 20 contains indentations 92 that redirect and mix the passage of heat exchange media 50 as it flows through the chamber 20.

Figure 12:
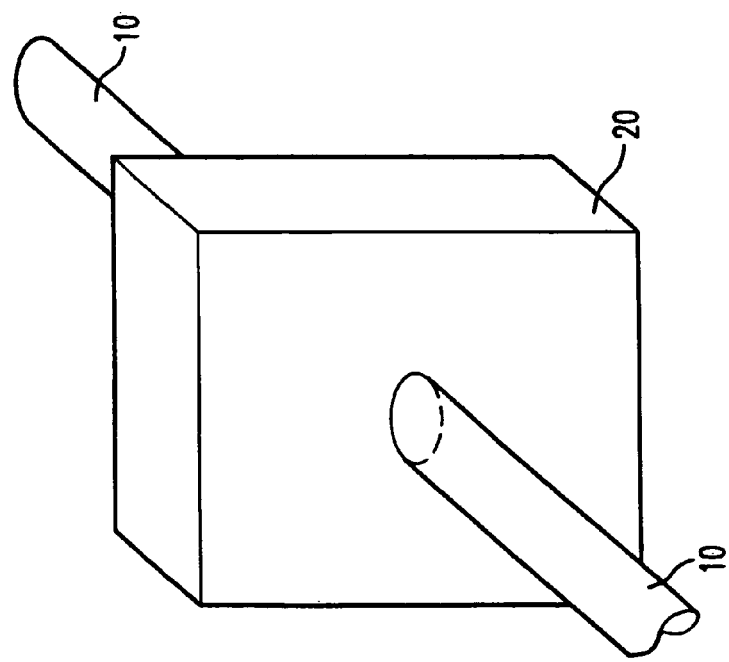
FIG. 12 illustrates another embodiment of the redirection chamber.

Referring to FIG. 12, the redirect chamber 20, in combination with any of the above embodiments, does not have to be cylinder-shaped, other embodiments may be shaped like a cube (with various ratios of height, length, and width dimensions), or other geometric shapes.

Figure 13A:
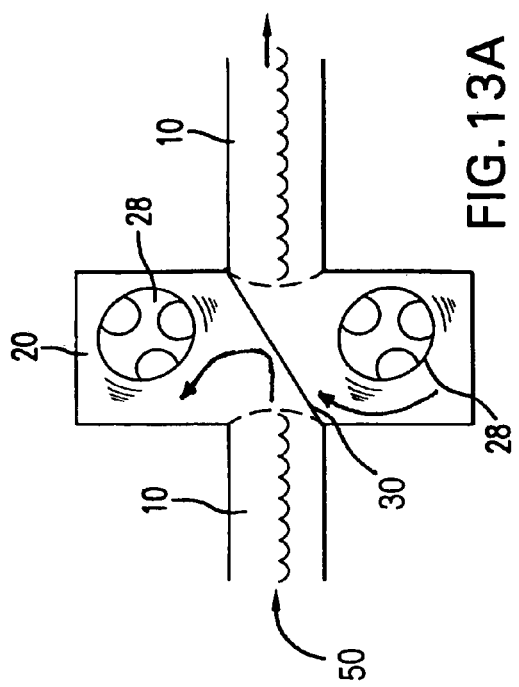
FIGS. 13A and 13B illustrate an embodiment using unsecured redirection members in the redirection chamber.
Figure 13B:
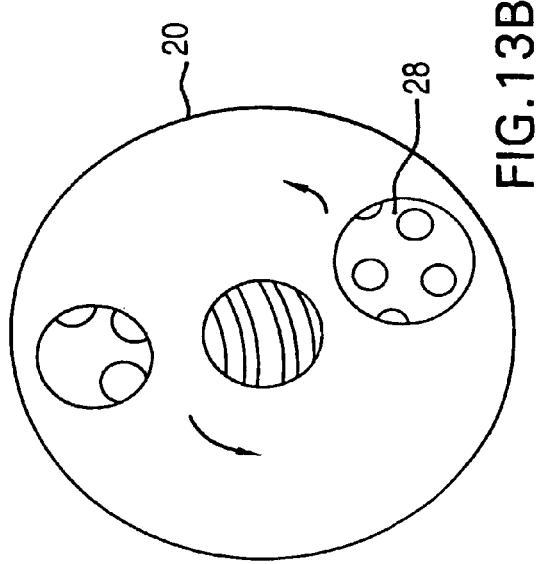

FIGS. 13A and 13B illustrate an embodiment of the invention where the redirection members 28 are not secured to an inside surface of the chamber 20. The arrows illustrate how the heat exchange media 50 may be directed according to the embodiment as shown. By way of example, the redirection members 28 could be a ball bearing or combination of multiple ball bearings that participate in a mixing and churning process within the chamber 20, as shown by the arrows in FIG. 13, which aids in the heat exchange process. The invention is not limited to using ball bearings in the chamber, as other unsecured redirection members may be used alone or in combination with one another for achieving greater heat exchange efficiency, such as a redirection member that is moved into a particular position by contact from heat exchange media.

The chamber generally has at least one greater dimension than the tube. For instance, the chamber may have a greater fluid capacity, circumference, or surface area. The ratio of a particular dimension between the tube and the chamber may be 1:1.1, 1:1.5, or any other ratio.

The tube and the chamber may be made of aluminum, either with cladding or without cladding. The tube and chamber may also be made of stainless steel, copper or other ferrous or non-ferrous materials. The tube and chamber may also be a plastic material or other composite materials. Likewise, the redirect member may be made of aluminum, either with cladding or without cladding. The redirect member may also be made of stainless steel, copper or other ferrous or non-ferrous materials. The redirect member may also be a plastic material or other composite materials. Also, an embodiment of the present invention allows for the tube to be made of a different material than the material used for the chamber, and the redirect members may be made of a different material than the material used for the chamber and tube. If more than one redirect member is used in an embodiment of the invention, one redirect member may be made of a different material than another redirect member. The redirect members may also be of different shapes than one another. Also, in embodiments that use more than one redirect member, one or more of the redirect members may be secured to the inside wall of the chamber and the other redirect members may be free to move around inside the redirect chamber.

The tube and chamber may be manufactured by stamping, cold forging, or machining. The tube and chamber may be manufactured as one piece or may be manufactured as two separate pieces.

The present invention has been described in an illustrative manner. The term "redirect" means to change the direction or course of, or impede the progress of, the heat exchange media, even if by the smallest difference in angle or velocity. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A heat exchange chamber comprising:
   an inlet for receiving a heat exchange medium flowing in a first flow direction in an initial line of flow;
   a plurality of walls defining a chamber interior which is in fluid communication with the inlet;
   a medium directing member, having an inclined surface facing the inlet, disposed at least partially within the chamber interior near the inlet to divert the medium from the initial line of flow to a second flow direction which is substantially perpendicular to the first flow direction so that the medium disperses within the chamber interior; and
   an outlet in fluid communication with the chamber interior for outputting the medium, the outlet having an opening rewardly facing the first flow direction,
   wherein the chamber is configured to cause the medium, subsequently to flowing in the first flow direction, to flow within the chamber interior in first and second generally semi-circular flow paths, each of which travels at least partially around a respective line segment extending from the inlet in the first flow direction and lies in a plane substantially perpendicular to the first flow direction, the first and second flow paths originating from a same region within the chamber interior and flowing in opposing generally semi-circular routes at least partially around the respective line segment.

2. The heat exchange chamber according to claim 1 wherein the chamber interior has a generally cylindrical shape.

3. The heat exchange chamber according to claim 1, wherein at least a portion of at least one of the chamber walls extends beyond the chamber interior in a radial direction.

4. The heat exchange chamber according to claim 1 further including at least one redirection member, disposed within the chamber interior, for assisting dispersion of the medium within the chamber interior.

5. The heat exchange chamber according to claim 4 wherein the redirection member is realized by an indentation in at least one of the chamber walls.

6. The heat exchange chamber according to claim 1, wherein the heat exchange chamber is realized by a plate, the chamber interior being formed by a cavity within the plate and the inlet being formed by a hole in the plate, the cavity being centered on the hole and having a diameter larger than a diameter of the hole.

7. A heat exchange assembly comprising:
   a plurality of tube-like segments for transporting a heat exchange medium in a first flow direction in an initial line of flow; and
   a plurality of heat exchange chambers, a heat exchange chamber being coupled between adjacent pairs of the tube-like segments, each of the heat exchange chambers including:
   an inlet for receiving the medium flowing in the first flow direction in the initial line of flow from a first one of the tube-like segments in an adjacent pair;

a plurality of walls defining a chamber interior which is in fluid communication with the inlet;

a medium directing member, having an inclined surface facing the inlet, disposed at least partially within the chamber interior near the inlet to divert the medium from the initial line of flow to a second flow direction which is substantially perpendicular to the first flow direction so that the medium disperses within the chamber interior; and an outlet in fluid communication with the chamber interior for outputting the medium in the first flow direction in the initial line of flow to the second one of the tube-like segments in the adjacent pair, wherein the chamber is configured to cause the medium, subsequently to flowing in the first flow direction, to flow within the chamber interior in first and second generally semi-circular flow paths, each of which travels at least partially around a respective line segment extending from the inlet in the first flow direction and which lies in a plane substantially perpendicular to the first flow direction, the first and second flow paths originating from a same region within the chamber interior and flowing in opposing generally semi-circular routes at least partially around the respective line segment.

8. The heat exchange assembly according to claim 7 wherein at least a portion of at least one of the chamber walls extends beyond the chamber interior in a radial direction.

9. A heat exchanger comprising:
a first reservoir having a plurality of outlets;
a second reservoir having a plurality of inlets, each of the inlets in the second reservoir corresponding to one of the outlets in the first reservoir; and
a plurality of heat exchange assemblies, each of the assemblies including:
a plurality of sets of tube-like segments for transporting a heat exchange medium from the first reservoir to the second reservoir, each set of the tube-like segments being disposed between one of the outlets of the first reservoir and the corresponding inlet in the second reservoir for transporting the medium in a first flow direction in respective initial lines of flow; and
a plurality of heat exchange chambers, a heat exchange chamber being coupled between adjacent pairs of the tube-like segments in a respective initial line of flow, each of the heat exchange chambers including:
a chamber inlet for receiving the medium flowing in the first flow direction in the respective initial line of flow from a first one of the tube-like segments in an adjacent pair;
a plurality of walls defining a chamber interior which is in fluid communication with the chamber inlet;
a medium directing member, having an inclined surface facing the chamber inlet, disposed at least partially within the chamber interior near the chamber inlet to divert the medium from the respective initial line of flow to a second flow direction which is substantially perpendicular to the first flow direction so that the medium disperses within the chamber interior; and
a chamber outlet in fluid communication with the chamber interior for outputting the medium in the first flow direction in the respective initial line of flow to the second one of the tube-like segments in the adjacent pair,
wherein the chamber is configured to cause the medium, subsequently to flowing in the first flow direction, to flow within the chamber interior in first and second generally semi-circular flow paths, each of which travels at least partially around a respective line segment extending from the chamber inlet in the first flow direction and which lies in a plane substantially perpendicular to the first flow direction, the first and second flow paths originating from a same region within the chamber interior and flowing in opposing generally semi-circular routes at least partially around the respective line segment.

10. The heat exchange chamber according to claim 1 wherein the inlet and outlet are axially aligned along the initial line of flow.

11. The heat exchange assembly according to claim 7 wherein the chamber interior has a generally cylindrical shape.

12. The heat exchange assembly according to claim 7 further including at least one redirection member, disposed within the chamber interior, for assisting dispersion of the medium within the chamber interior.

13. The heat exchange assembly according to claim 12 wherein the redirection member is realized by an indentation in at least one of the chamber walls.

14. The heat exchanger according to claim 9 wherein the chamber interior has a generally cylindrical shape.

15. The heat exchanger according to claim 9 wherein at least a portion of at least one of the chamber walls extends beyond the chamber interior in a radial direction.

16. The heat exchanger according to claim 9 further including at least one redirection member, disposed within the chamber interior, for assisting dispersion of the medium within the chamber interior.

17. The heat exchanger according to claim 16 wherein the redirection member is realized by an indentation in at least one of the chamber walls.

18. A heat exchange chamber comprising:
an inlet for receiving a heat exchange medium flowing in a first flow direction in an initial line of flow;
a plurality of walls defining a chamber interior which is in fluid communication with the inlet;
an outlet in fluid communication with the chamber interior; and
a medium directing member disposed at least partially within the chamber interior, the medium directing member having a surface which faces the inlet and which has an incline relative to the first flow direction to divert the medium from the initial line of flow so that the medium disperses within the chamber interior,
wherein the chamber is configured to cause the medium dispersed within the chamber to flow in at least two generally semi-circular flow paths and thereafter to flow through the outlet in the first flow direction.

19. The heat exchange chamber according to claim 18 wherein the surface of the medium directing member is inclined relative to the first flow direction such that the medium is diverted to flow in a second flow direction which is substantially perpendicular to the first flow direction.

20. The heat exchange chamber according to claim 18 wherein the inlet and the outlet are axially aligned along the initial line of flow.

21. The heat exchange chamber according to claim 18 wherein the chamber interior has a generally cylindrical shape.

22. The heat exchange chamber according to claim 18 wherein at least a portion of at least one of the chamber walls extends beyond the chamber interior in a radial direction.

23. The heat exchange chamber according to claim 18 further including at least one redirection member, disposed within the chamber interior, for assisting dispersion of the medium within the chamber interior.

24. The heat exchange chamber according to claim 23 wherein the redirection member is realized by an indentation in at least one of the chamber walls.

25. A heat exchange assembly comprising:
a plurality of tube-like segments for transporting a heat exchange medium in a first flow direction in an initial line of flow; and
a plurality of heat exchange chambers, a heat exchange chamber being coupled between adjacent pairs of the tube-like segments, each of the heat exchange chambers including:
an inlet for receiving the medium flowing in the first flow direction in the initial line of flow from a first one of the tube-like segments in an adjacent pair;
a plurality of walls defining a chamber interior which is in fluid communication with the inlet;
an outlet in fluid communication with the chamber interior for outputting the medium; and
a medium directing member disposed at least partially within the chamber interior, the medium directing member having a surface which faces the inlet and which has an incline relative to the first flow direction to divert the medium from the initial line of flow so that the medium disperses within the chamber interior,
wherein the chamber is configured to cause the medium dispersed within the chamber to flow in at least two generally semi-circular flow paths and thereafter to flow through the outlet in the first flow direction in the initial line of flow to the second one of the tube-like segments in the adjacent pair.

26. The heat exchange assembly according to claim 25 wherein the surface of the medium directing member is inclined relative to the first flow direction such that the medium is diverted to flow in a second flow direction which is substantially perpendicular to the first flow direction.

27. The heat exchange assembly according to claim 25 wherein the chamber interior has a generally cylindrical shape.

28. The heat exchange assembly according to claim 25 wherein at least a portion of at least one of the chamber walls extends beyond the chamber interior in a radial direction.

29. The heat exchange assembly according to claim 25 further including at least one redirection member, disposed within the chamber interior, for assisting dispersion of the medium within the chamber interior.

30. The heat exchange assembly according to claim 29 wherein the redirection member is realized by an indentation in at least one of the chamber walls.

31. A heat exchanger comprising:
a first reservoir having a plurality of outlets;
a second reservoir having a plurality of inlets, each of the inlets in the second reservoir corresponding to one of the outlets in the first reservoir; and
a plurality of heat exchange assemblies, each of the assemblies including:
a plurality of sets of tube-like segments for transporting a heat exchange medium from the first reservoir to the second reservoir, each set of the tube-like segments being disposed between one of the outlets of the first reservoir and the corresponding inlet in the second reservoir for transporting the medium in a first flow direction in respective initial lines of flow; and
a plurality of heat exchange chambers, a heat exchange chamber being coupled between adjacent pairs of the tube-like segments in a respective initial line of flow, each of the heat exchange chambers including:
a chamber inlet for receiving the medium flowing in the first flow direction in the respective initial line of flow from a first one of the tube-like segments in an adjacent pair;
a plurality of walls defining a chamber interior which is in fluid communication with the chamber inlet;
a chamber outlet in fluid communication with the chamber interior for outputting the medium; and
a medium directing member disposed at least partially within the chamber interior, the medium directing member having a surface which faces the chamber inlet and which has an incline relative to the first flow direction to divert the medium from the initial line of flow so that the medium disperses within the chamber interior,
wherein the chamber is configured to cause the medium dispersed within the chamber to flow in at least two generally semi-circular flow paths and thereafter to flow through the chamber outlet in the first flow direction in the initial line of flow to the second one of the tube-like segments in the adjacent pair.

32. The heat exchanger according to claim 31 wherein the surface of the medium directing member is inclined relative to the first flow direction such that the medium is diverted to flow in a second flow direction which is substantially perpendicular to the first flow direction.

33. The heat exchanger according to claim 31 wherein the chamber interior has a generally cylindrical shape.

34. The heat exchanger according to claim 31 wherein at least a portion of at least one of the chamber walls extends beyond the chamber interior in a radial direction.

35. The heat exchanger according to claim 31 further including at least one redirection member, disposed within the chamber interior, for assisting dispersion of the medium within the chamber interior.

36. The heat exchanger according to claim 35 wherein the redirection member is realized by an indentation in at least one of the chamber walls.

37. A heat exchange chamber comprising:
an inlet for receiving a heat exchange medium flowing in a first flow direction in an initial line of flow;
a plurality of walls defining a chamber interior which is in fluid communication with the inlet;
an outlet in fluid communication with the chamber interior; and
a medium directing member disposed at least partially within the chamber interior, the medium directing member having a first surface which faces the inlet and a second surface which faces the outlet, the first surface having an incline to divert the medium from the first flow direction to a second flow direction, the chamber being configured to cause the medium to flow within the chamber interior and return to the second flow direction into contact with the second surface of the medium directing member, the second surface having a decline to divert the medium from the second flow direction through the outlet in the first flow direction,
wherein the chamber is configured to cause the medium to flow within the chamber interior in first and second generally semi-circular flow paths.

38. The heat exchange chamber according to claim 37 wherein the first surface of the medium directing member is inclined relative to the first flow direction such that the second flow direction is substantially perpendicular to the first flow direction.

39. The heat exchange chamber according to claim 37 wherein the inlet and the outlet are axially aligned along the initial line of flow.

40. The heat exchange chamber according to claim 37 wherein the chamber interior has a generally cylindrical shape.

41. The heat exchange chamber according to claim 37 wherein at least a portion of at least one of the chamber walls extends beyond the chamber interior in a radial direction.

42. The heat exchange chamber according to claim 37 further including at least one redirection member, disposed within the chamber interior, for directing flow of the medium within the chamber interior.

43. The heat exchange chamber according to claim 42 wherein the redirection member is realized by an indentation in at least one of the chamber walls.

44. A heat exchange assembly comprising:
a plurality of tube-like segments for transporting a heat exchange medium in a first flow direction in an initial line of flow; and
a plurality of heat exchange chambers, a heat exchange chamber being coupled between adjacent pairs of the tube-like segments, each of the heat exchange chambers including:
an inlet for receiving the medium flowing in the first flow direction in the initial line of flow from a first one of the tube-like segments in an adjacent pair;
a plurality of walls defining a chamber interior which is in fluid communication with the inlet;
an outlet in fluid communication with the chamber interior for outputting the medium; and
a medium directing member disposed at least partially within the chamber interior, the medium directing member having a first surface which faces the inlet and a second surface which faces the outlet, the first surface having an incline to divert the medium from the first flow direction to a second flow direction, the chamber being configured to cause the medium to flow within the chamber interior and return to the second flow direction into contact with the second surface of the medium directing member, the second surface having a decline to divert the medium from the second flow direction through the outlet in the first flow direction,
wherein the chamber is configured to cause the medium to flow within the chamber interior in first and second generally semi-circular flow paths.

45. The heat assembly according to claim 44 wherein the first surface of the medium directing member is inclined relative to the first flow direction such that the second flow direction is substantially perpendicular to the first flow direction.

46. The heat exchange assembly according to claim 44 wherein the chamber interior has a generally cylindrical shape.

47. The heat exchange assembly according to claim 44 wherein at least a portion of at least one of the chamber walls extends beyond the chamber interior in a radial direction.

48. The heat exchange assembly according to claim 44 further including at least one redirection member, disposed within the chamber interior, for directing flow of the medium within the chamber interior.

49. The heat exchange assembly according to claim 48 wherein the redirection member is realized by an indentation in at least one of the chamber walls.

50. A heat exchanger comprising:
a first reservoir having a plurality of outlets;
a second reservoir having a plurality of inlets, each of the inlets in the second reservoir corresponding to one of the outlets in the first reservoir; and
a plurality of heat exchange assemblies, each of the assemblies including:
a plurality of sets of tube-like segments for transporting a heat exchange medium from the first reservoir to the second reservoir, each set of the tube-like segments being disposed between one of the outlets of the first reservoir and the corresponding inlet in the second reservoir for transporting the medium in a first flow direction in respective initial lines of flow; and
a plurality of heat exchange chambers, a heat exchange chamber being coupled between adjacent pairs of the tube-like segments in a respective initial line of flow, each of the heat exchange chambers including:
a chamber inlet for receiving the medium flowing in the first flow direction in the respective initial line of flow from a first one of the tube-like segments in an adjacent pair;
a plurality of walls defining a chamber interior which is in fluid communication with the chamber inlet;
a chamber outlet in fluid communication with the chamber interior for outputting the medium; and
a medium directing member disposed at least partially within the chamber interior, the medium directing member having a first surface which faces the chamber inlet and a second surface which faces the chamber outlet, the first surface having an incline to divert the medium from the first flow direction to a second flow direction, the chamber being configured to cause the medium to flow within the chamber interior and return to the second flow direction into contact with the second surface of the medium directing member, the second surface having a decline to divert the medium from the second flow direction through the chamber outlet in the first flow direction,
wherein the chamber is configured to cause the medium to flow within the chamber interior in first and second generally semi-circular flow paths.

51. The heat exchanger according to claim 50 wherein the first surface of the medium directing member is inclined relative to the first flow direction such that the second flow direction is substantially perpendicular to the first flow direction.

52. The heat exchanger according to claim 50 wherein the chamber interior has a generally cylindrical shape.

53. The heat exchanger according to claim 50 wherein at least a portion of at least one of the chamber walls extends beyond the chamber interior in a radial direction.

54. The heat exchanger according to claim 50 further including at least one redirection member, disposed within the chamber interior, for directing flow of the medium within the chamber interior.

55. The heat exchanger according to claim 54 wherein the redirection member is realized by an indentation in at least one of the chamber walls.

* * * * *